United States Patent
Igarashi et al.

(10) Patent No.: US 9,066,101 B2
(45) Date of Patent: Jun. 23, 2015

(54) IMAGE PROCESSING APPARATUS AND IMAGE PROCESSING METHOD

(75) Inventors: Susumu Igarashi, Kawasaki (JP); Koji Okawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 13/456,889

(22) Filed: Apr. 26, 2012

(65) Prior Publication Data

US 2012/0288204 A1 Nov. 15, 2012

(30) Foreign Application Priority Data

May 12, 2011 (JP) .................................. 2011-107636

(51) Int. Cl.
- *G06K 9/66* (2006.01)
- *H04N 19/17* (2014.01)
- *H04N 19/124* (2014.01)
- *H04N 19/136* (2014.01)
- *H04N 19/14* (2014.01)

(52) U.S. Cl.
CPC ............. *H04N 19/17* (2014.11); *H04N 19/124* (2014.11); *H04N 19/136* (2014.11); *H04N 19/14* (2014.11)

(58) Field of Classification Search
CPC ................................................ H04N 19/0026
USPC ....................... 382/195, 173, 232; 375/240.03
See application file for complete search history.

(56) References Cited

U.S. PATENT DOCUMENTS

| 5,848,194 | A | 12/1998 | Ishizuka et al. ............... 382/234 |
| 6,304,606 | B1 * | 10/2001 | Murashita et al. ........ 375/240.24 |
| 6,603,413 | B2 | 8/2003 | Igarashi et al. .................. 341/67 |
| 6,947,602 | B2 | 9/2005 | Igarashi et al. ............... 382/235 |
| 6,993,202 | B2 | 1/2006 | Igarashi et al. ............... 382/246 |
| 7,127,119 | B2 | 10/2006 | Igarashi ........................ 382/250 |
| 7,218,788 | B2 | 5/2007 | Igarashi et al. ............... 382/239 |
| 2008/0056365 | A1 * | 3/2008 | Igarashi ................... 375/240.13 |
| 2010/0189175 | A1 * | 7/2010 | Fujii et al. ................. 375/240.03 |
| 2011/0026849 | A1 * | 2/2011 | Kameyama .................... 382/260 |

FOREIGN PATENT DOCUMENTS

JP 2010-193441 9/2010

OTHER PUBLICATIONS

"Information Technology—Coding of Audio-Visual Objects—Part 2: Visual", ISO/IEC International Standard 14496-2 (MPEG-4 Visual), Second Edition, Dec. 1, 2001.

(Continued)

*Primary Examiner* — Mike Rahmjoo
(74) *Attorney, Agent, or Firm* — Fitzpatrick, Cella, Harper & Scinto (57) ABSTRACT

An area where a specific object is captured is extracted as a specific area from the image of a frame of interest, and the evaluation value of the specific area is obtained using a predetermined evaluation formula. It is determined whether the evaluation value of the specific area in a frame preceding the frame of interest has exceeded a predetermined threshold. When it is determined that the evaluation value of the specific area has exceeded the predetermined threshold, the frame of interest is encoded to set the code amount of the specific area in the image of the frame of interest to be smaller than that of the specific area in the image of the frame preceding the frame of interest.

10 Claims, 7 Drawing Sheets (56) References Cited

OTHER PUBLICATIONS

"Information Technology—Coding of Audio-Visual Objects—Part 10: Advanced Video Encoding", ISO/IEC International Standard 14496-10 (MPEG-4 Advanced Video Coding), First Edition, Dec. 1, 2003.

U.S. Appl. No. 13/478,767, filed May 23, 2012.
U.S. Appl. No. 13/485,315, filed May 31, 2012.

* cited by examiner

IMAGE PROCESSING APPARATUS AND IMAGE PROCESSING METHOD

BACKGROUND OF THE INVENTION

1. Field of the Invention

The present invention relates to an encoding technique.

2. Description of the Related Art

Image signal encoding techniques are used to transmit, accumulate, and play back moving images. Of these techniques, an international standardization encoding method such as ISO/IEC International Standard 14496-2 (MPEG-4 Visual) has been known as a moving image encoding technique. Another international standardization encoding method is H.264 defined by ITU-T and ISO/IEC. In this specification, ITU-T Rec. H.264 Advanced Video Coding|ISO/IEC International Standard 14496-10 (MPEG-4 AVC) will be simply referred to as H.264.

These techniques are also used in the field of video cameras, recorders, and the like, and are actively applied especially to monitoring video cameras (to be referred to as monitoring cameras) recently. In the application to monitoring cameras, a moving image is often encoded at a relatively low bit rate to suppress the size of encoded data for the necessity of long-time recording. However, low-bit-rate encoding loses a large amount of information and degrades the image quality, and the monitoring camera cannot achieve original application purposes such as specifying a human face.

To prevent this, a technique of not uniformly encoding an entire frame, but detecting an important area such as a human face as a specific area to divide a frame into specific and unspecific areas is generally employed. This technique encodes a moving image to suppress the code amount in the unspecific area and prevent degradation of the image quality in the specific area.

However, this technique has a problem in which when a plurality of specific areas exist in a frame, if large code amounts are assigned to all the specific areas, the code amount of the entire frame increases and exceeds a target value. This technique also has a problem in which if code amounts are assigned averagely to all the specific areas so that the code amount of the entire frame does not exceed the target value, the specific area cannot obtain an image quality intended to specify a person or the like.

There have been proposed techniques which solve these problems by controlling assignment of the code amount to each specific area. An example of the conventional techniques is patent literature 1 (Japanese Patent Laid-Open No. 2010-193441). In patent literature 1, when the area ratio of a specific area to an entire input image is relatively high, the degree at which the code amount to be assigned to the specific area is increased is decreased. When the area ratio of a specific area to an entire input image is relatively low, the degree at which the code amount to be assigned to the specific area is increased is increased. This technique can reliably create compressed data capable of clearly playing back a face captured small. For a face captured large, an image quality high enough to recognize the face can be maintained even if the compression ratio hardly decreases.

However, in this conventional technique, even when the area ratio of a specific area to an entire input image is low, if many specific areas exist, no intended image quality may be able to be obtained. The code amount to be assigned is controlled in accordance with the area ratio of a specific area to an entire input image. For example, when an object faces sideways, the face captured small cannot be discriminated.

SUMMARY OF THE INVENTION

The present invention has been made to solve the above problems, and provides an encoding technique capable of obtaining an intended image quality for a specific area without increasing the code amount of an entire image even when many specific areas exist in the image.

According to the first aspect of the present invention, an image processing apparatus which encodes respective frames that form a moving image, comprises: an extraction unit that extracts an area where a specific object is captured, as a specific area from an image of a frame of interest; an evaluation unit that obtains an evaluation value of the specific area using a predetermined evaluation formula; a determination unit that determines whether the evaluation value of the specific area in a frame preceding the frame of interest has exceeded a predetermined threshold; and an encoding unit that, when the determination unit determines that the evaluation value of the specific area has exceeded the predetermined threshold, encodes the frame of interest to set a code amount of the specific area in the image of the frame of interest to be smaller than a code amount of the specific area in an image of the frame preceding the frame of interest.

According to the second aspect of the present invention, an image processing method to be performed by an image processing apparatus which encodes respective frames that form a moving image, comprises: an extraction step of extracting an area where a specific object is captured, as a specific area from an image of a frame of interest; an evaluation step of obtaining an evaluation value of the specific area using a predetermined evaluation formula; a determination step of determining whether the evaluation value of the specific area in a frame preceding the frame of interest has exceeded a predetermined threshold; and an encoding step of, when the evaluation value of the specific area is determined in the determination step to have exceeded the predetermined threshold, encoding the frame of interest to set a code amount of the specific area in the image of the frame of interest to be smaller than a code amount of the specific area in an image of the frame preceding the frame of interest.

Further features of the present invention will become apparent from the following description of exemplary embodiments with reference to the attached drawings.

DESCRIPTION OF THE EMBODIMENTS

Embodiments of the present invention will now be described with reference to the accompanying drawings.

Note that the following embodiments are merely examples of concretely practicing the present invention, and are detailed examples of arrangements defined in the scope of appended claims.

First Embodiment

The first embodiment will describe an image processing apparatus which encodes respective frames that form a moving image. First, the functional arrangement of the image processing apparatus according to the first embodiment will be explained with reference to the block diagram of FIG. 1.

Figure 1:
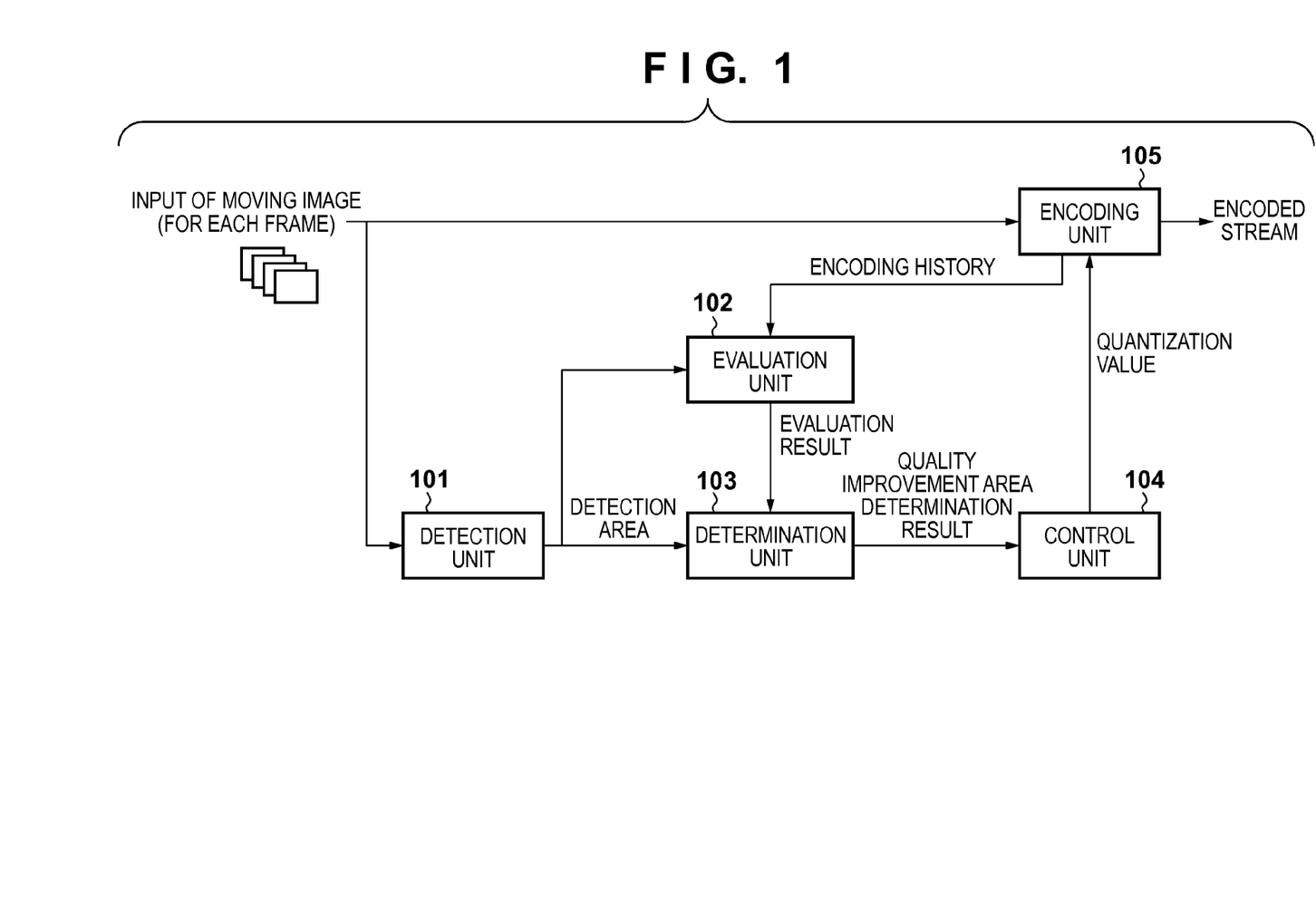
FIG. 1 is a block diagram exemplifying the functional arrangement of an image processing apparatus.

The images of respective frames which form a moving image are sequentially input to a detection unit 101 and encoding unit 105.

The detection unit 101 detects (extracts) an area where a specific object is captured, as a specific area from the image of an input frame (image of a frame of interest). For the detected specific area, the detection unit 101 generates specific area information including the position of the specific area in the image and the size and identifier of the specific area. For example, when the detection unit 101 detects specific area 1, specific area 2, . . . , specific area P from an image, it outputs (position of specific area 1 in the image, size of specific area 1, and identifier=1) as specific area information of specific area 1. As specific area information of specific area P, the detection unit 101 outputs (position of specific area P in the image, size of specific area P, and identifier=P). In this manner, the detection unit 101 generates specific area information for each specific area detected from an image. The detection unit 101 performs this processing for each frame. Note that the specific area information is arbitrary as long as it can uniquely specify each specific area in an image.

By using a predetermined evaluation formula, an evaluation unit 102 calculates the evaluation value of a specific area detected from the image of a frame of interest. When a plurality of specific areas are detected from the image, the evaluation unit 102 calculates an evaluation value for each specific area.

A determination unit 103 determines whether there is a specific area where the evaluation value has exceeded a threshold in all frames from a frame preceding the frame of interest by N (N is a natural number) frames up to the frame of interest. When a plurality of specific areas are detected from the image, the determination unit 103 makes this determination for each specific area.

A control unit 104 sets encoding parameters respectively for specific and unspecific areas in the image of a frame of interest. In particular, the control unit 104 sets an encoding parameter as follows for a specific area for which it is determined that the evaluation value has exceeded the threshold in respective frames from a frame preceding the frame of interest by N frames up to the frame of interest. More specifically, the control unit 104 sets an encoding parameter for a specific area in the image of the frame of interest so that the code amount of the specific area in the image of the frame of interest becomes smaller than that of the specific area in the image of a frame preceding the frame of interest. The embodiment handles a quantization step as an example of the encoding parameter. In addition to setting of the encoding parameter, the control unit 104 controls the operation of the overall image processing apparatus.

The encoding unit 105 encodes specific and unspecific areas in the image of the frame of interest using quantization steps set by the control unit 104 for the respective areas. The encoding unit 105 outputs the encoding result as that of the image of the frame of interest.

Figure 2:
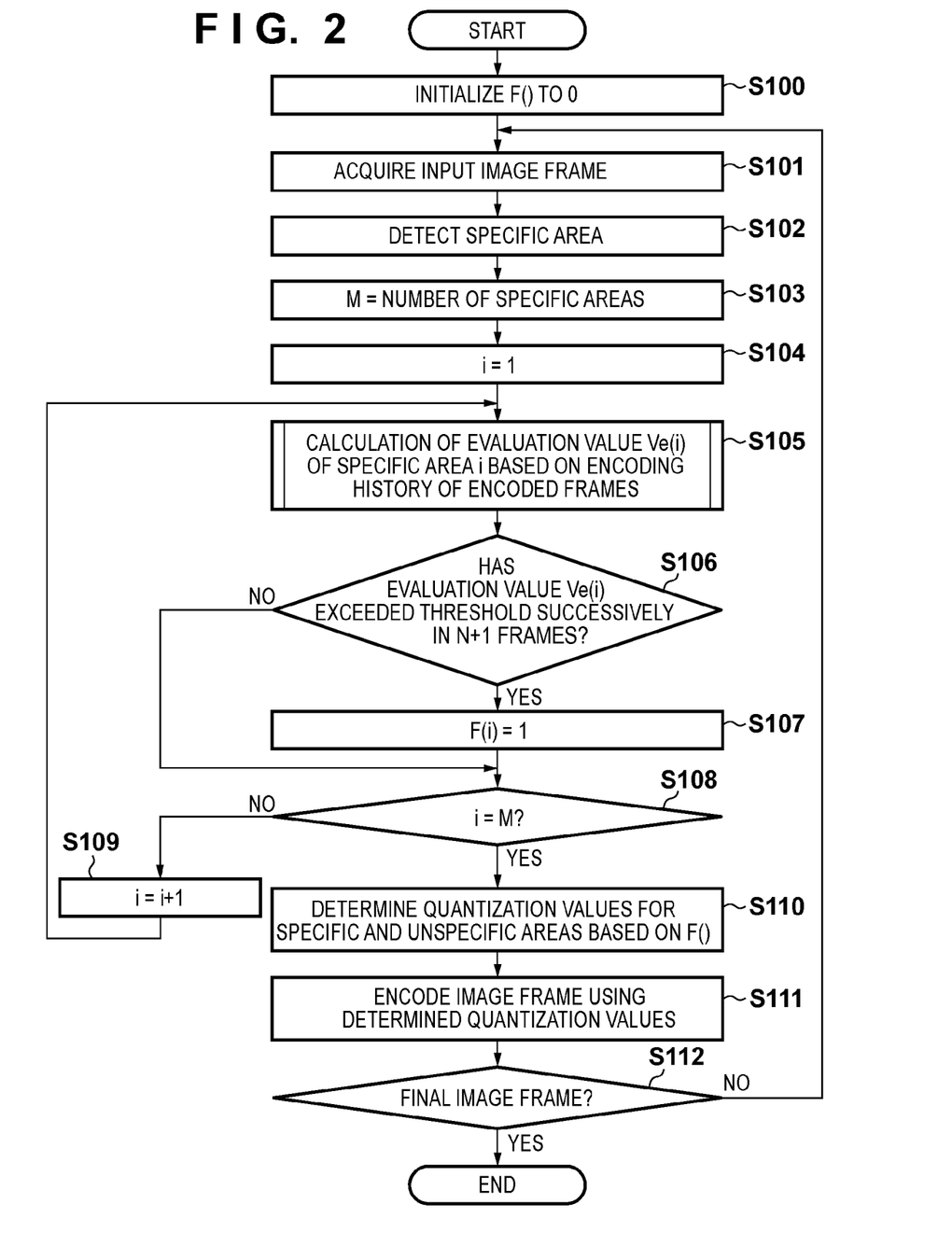
FIG. 2 is a flowchart showing processing to be performed by the image processing apparatus.
Figure 3:
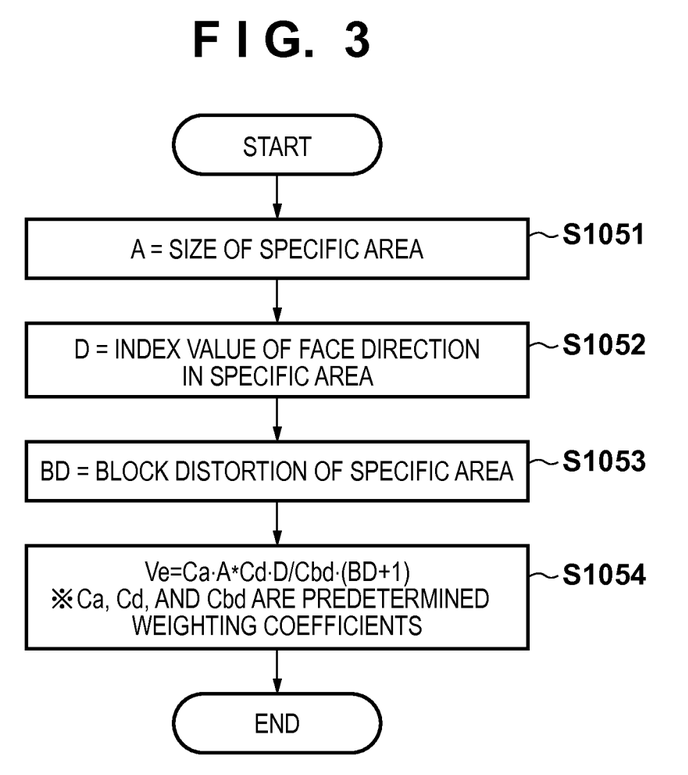
FIG. 3 is a flowchart showing processing to be performed by the image processing apparatus.

The operations of the respective units shown in FIG. 1 will be explained with reference to the flowcharts of FIGS. 2 and 3. In step S100, the control unit 104 initializes a variable F( ) used in subsequent processes to 0. F( ) is an array variable. In this case, F( ) is initialized to $F(1)=F(2)=\ldots=F(Q)=0$ (Q is a sufficiently large specified value).

In step S101, the detection unit 101 and encoding unit 105 acquire the image of a frame of interest input to the image processing apparatus.

In step S102, the detection unit 101 detects an area where a specific object is captured, as a specific area from the image of the frame of interest. For the detected specific area, the detection unit 101 generates specific area information including the position of the specific area in the image and the size and identifier of the specific area. For a specific area for which an identifier has been issued upon detection, the detection unit 101 keeps tracking the specific area through frames and issues the same identifier. Note that a "specific object" is not particularly limited, and may be any target as long as it is set in advance as an important object depending on a use case, such as a human face, human body, animal face, or car license plate.

In step S103, the control unit 104 sets, in a variable M used below, the number of specific areas detected from the image of the frame of interest by the detection unit 101. The number of specific areas is equal to a maximum value among identifiers issued for the respective specific areas detected from the image of the frame of interest by the detection unit 101.

In step S104, the control unit 104 initializes a variable i used in subsequent processes to 1.

In step S105, the evaluation unit 102 calculates the evaluation value Ve(i) of a specific area having the identifier=i (to be referred to as a specific area i) by using a predetermined evaluation formula. Details of the processing in step S105 will be explained with reference to the flowchart of FIG. 3.

In step S1051, the evaluation unit 102 sets, in a variable A, the size of the specific area i that is contained in specific area information of the specific area i. Since the encoding unit 105 divides an image into a plurality of pixel blocks and encodes them, the size of the specific area i means the number of pixel blocks contained in the specific area i. Note that specific area information of the specific area i used here may be generated from the image of a frame of interest or the image of a frame preceding the frame of interest.

In step S1052, the evaluation unit 102 sets, in a variable D, a value corresponding to the direction of an object captured in the specific area i within the image of the frame of interest (or a frame preceding the frame of interest). For example, 10 is set in the variable D when the object faces front, 5 is set in the variable D when the object faces just sideways, and 0 is set in the variable D when the object faces just behind. For another direction, an intermediate value between these values is set in the variable D in accordance with the degree of direction. The direction of an object in an image can be obtained by a well-known image recognition technique, so a detailed description thereof will be omitted.

In step S1053, the evaluation unit 102 sets, in a variable BD, a value corresponding to the block distortion of the specific area i that is obtained from the encoding result of the specific area i in a frame preceding the frame of interest. For example, 0 is set in the variable BD when there is no block distortion, and a larger value is set in the variable BD as the distortion becomes larger. For example, after the image of a frame of interest is encoded using a currently set encoding parameter and then decoded, the block distortion may be obtained from a pixel block before encoding and a pixel block after decoding. The method is not particularly limited.

In step S1054, the evaluation unit 102 obtains the evaluation value Ve(i) for the specific area i by solving the following formula using the variables A, D, and BD whose values have been finalized in steps S1051 to S1053:

$$Ve=Ca \cdot A \times Cd \cdot D/Cbd \cdot (BD+1)$$

where Ca, Cd, and Cbd are predetermined weighting coefficients. An arbitrary value of 0 or larger is set in advance for each weighting coefficient. This calculation can provide the evaluation value Ve(i) for the specific area i. Note that the evaluation value calculation method and the parameters used to calculate an evaluation value are not limited to the above-described ones.

Referring back to FIG. 2, in step S106, the determination unit 103 determines whether the evaluation value Ve(i) has exceeded a predetermined threshold in respective frames from a frame preceding the frame of interest by N (N is a natural number) frames up to the frame of interest. N is a predetermined value.

If the determination unit 103 determines that the evaluation value Ve(i) has exceeded the threshold, the process advances to step S107; if NO, to step S108. In step S107, 1 is set in the variable F(i) for the specific area i.

In step S108, the control unit 104 determines whether the processes in steps S105, S106, and S107 have been performed for all specific areas detected in step S102, that is, whether the value of the variable i equals that of the variable M. If the control unit 104 determines i=M, the process advances to step S110; if i<M, to step S109.

In step S109, the control unit 104 increments the value of the variable i by one. Then, the process returns to step S105 to perform subsequent processes for an unprocessed specific area.

In step S110, the control unit 104 sets encoding parameters for specific and unspecific areas in the image of the frame of interest. The encoding parameter set for a specific area changes depending on which of 1 and 0 is set as the value of the variable F( ) for the specific area.

When setting an encoding parameter for the specific area i, the value of the variable F(i) is referred to first. For F(i)=1, the encoding parameter is set so that the code amount of the specific area i in the frame of interest becomes smaller than that of the specific area i in the image of a frame preceding the frame of interest. The embodiment uses a quantization step as the encoding parameter. In this case, the quantization step may be changed to be larger than a quantization step set for the specific area i for F(i)=0 or to be larger than a previous quantization step set for the specific area i. Accordingly, the code amount of a specific area for which F( ) has become 1 is suppressed unless F( ) is initialized to 0.

To the contrary, for F(i)=0, the encoding parameter is set so that the code amount of the specific area i in the frame of interest becomes larger than that of the specific area i in the image of a frame preceding the frame of interest. The embodiment uses a quantization step as the encoding parameter. In this case, the quantization step may be changed to be smaller than a quantization step initially set for the specific area i or to be smaller than a previous quantization step set for the specific area i. For F(i)=0, the encoding parameter may remain unchanged intentionally for the purpose of reducing the total code amount.

For an unspecific area, a quantization step at least larger than a quantization step set for F(i)=0 is set.

In step S111, the encoding unit 105 encodes the image of the frame of interest by encoding the specific and unspecific areas in the image of the frame of interest using the encoding parameters set by the control unit 104 for the respective areas.

The encoding unit 105 outputs the encoding result as an encoded stream. The output destination is not particularly limited, and the encoded stream may be output to a memory managed by the image processing apparatus or an external apparatus or transmitted to an external apparatus via a network.

In step S112, the control unit 104 determines whether the processes in steps S101 to S111 have been performed for all frames input to the image processing apparatus. If the control unit 104 determines that the processes in steps S101 to S111 have been performed for all frames, the process ends. If there is a frame not having undergone the processes of steps S101 to S111, the process advances to step S101 to perform subsequent processes for the frame.

Figure 7:
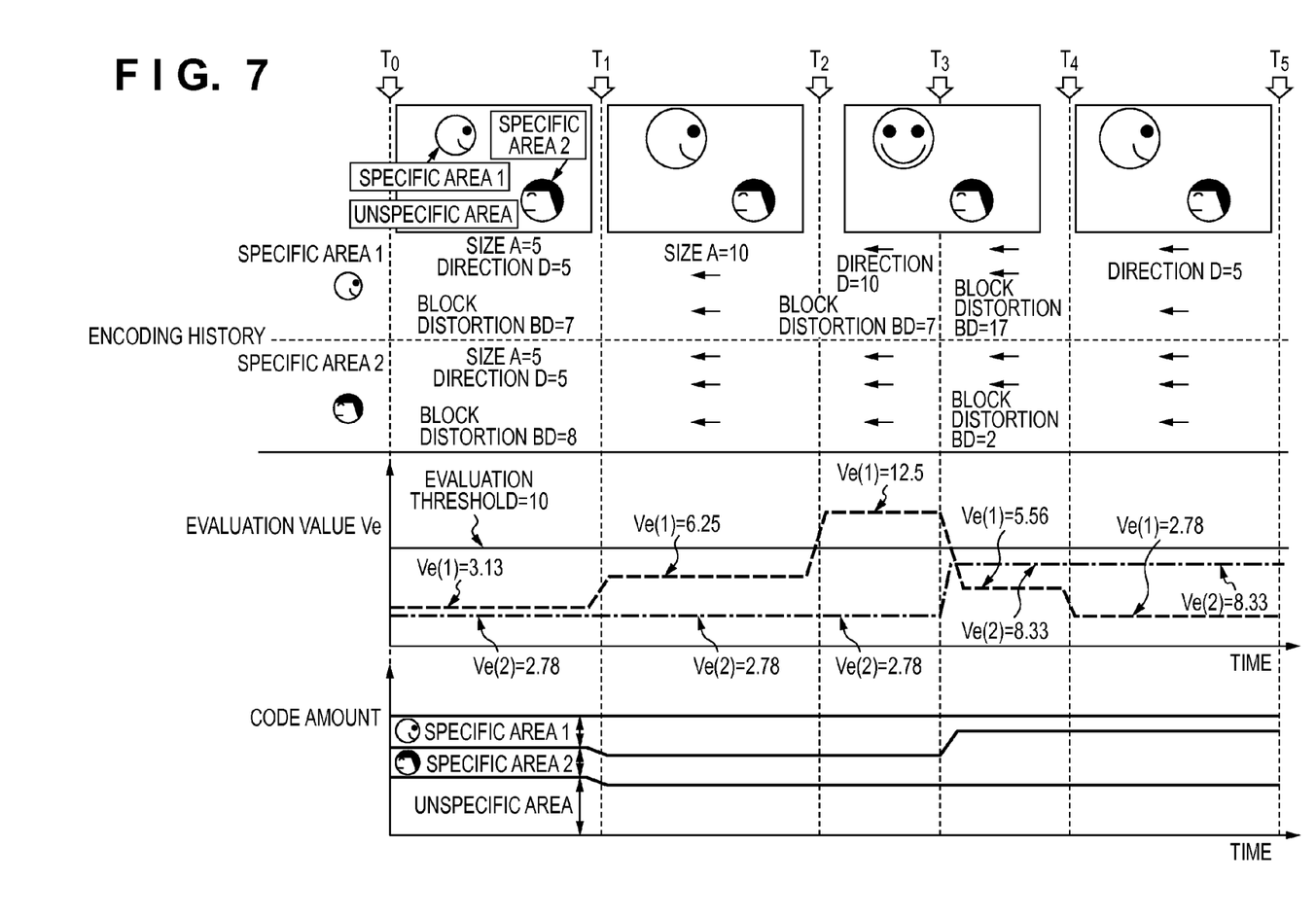
FIG. 7 is a view exemplifying encoding processing.

The above-described encoding processing will be exemplified with reference to FIG. 7 by exemplifying a case in which two specific areas (specific area 1 and specific area 2) are detected from the image of a frame of interest. In FIG. 7, the threshold is set to 10.

Specific area 1 and specific area 2 are detected from each frame input in the period (period 01) between time T0 and time T1, and the sizes of both the specific areas are maintained at 5. Hence, in period 01, 5 is set in the variable A for the respective specific areas. In period 01, the object directions in the respective specific areas are maintained to be sideways. In period 01, a corresponding value of 5 is set in the variable D for the respective specific areas. In period 01, the block distortions in specific area 1 and specific area 2 are 7 and 8, respectively. In period 01, 7 and 8 are set in the variable BD for the respective specific areas.

When all the weighting coefficients Ca, Cd, and Cbd are set to 1 in advance, the evaluation value Ve(1) for specific area 1 and the evaluation value Ve(2) for specific area 2 are calculated according to the following formulae:

$$Ve(1) = Ca \cdot A \times Cd \cdot D/Cbd \cdot (BD+1)$$
$$= 1 \cdot 5 \times 1 \cdot 5/1 \cdot (7+1)$$
$$= 3.13$$

$$Ve(2) = Ca \cdot A \times Cd \cdot D/Cbd \cdot (BD+1)$$
$$= 1 \cdot 5 \times 1 \cdot 5/1 \cdot (8+1)$$
$$= 2.78$$

In this way, in period 01, the evaluation values of specific area 1 and specific area 2 are maintained at values which do not exceed the threshold. Thus, the quantization step does not change in period 01.

At time T1, the size of specific area 1 changes from 5 to 10. Since the area of the unspecific area relatively decreases, a code amount assigned to the unspecific area decreases. Also, since the size of specific area 1 changes, the evaluation value Ve(1) changes from 3.13 to 6.25. In contrast, Ve(2) does not change from 2.78. In the subsequent period (period 12) between time T1 and time T2, the evaluation values of specific area 1 and specific area 2 neither change nor exceed the threshold. Hence, the quantization step does not change in period 12.

At time T2, the object in specific area 1 faces front, and the value of the variable D changes from 5 to 10. In accordance with this, the evaluation value Ve(1) changes from 6.25 to 12.5, and exceeds the threshold. To the contrary, Ve(2) does not change from 2.78. In the subsequent period (period 23) between time T2 and time T3, the evaluation value Ve(1) exceeds the threshold, but the duration of period 23 does not exceed N. Also, the evaluation value of specific area 2 neither changes nor exceeds the threshold. Thus, the quantization step does not change in period 23.

At time T3, the evaluation value Ve(1) of specific area 1 has exceeded the threshold in N successive frames. In this case, 1 is set in the variable F(1) for specific area 1. At this time, F(2)=0, so the quantization step for specific area 1 is set larger. In the subsequent period (period 34) between time T3 and time T4, the block distortion for specific area 1 changes from 7 to 17 because the quantization step for specific area 1 is set larger. Accordingly, the evaluation value Ve(1) changes from 12.5 to 5.56. As the quantization step for specific area 1 increases, the code amount assigned to specific area 1 is expected to decrease. The control unit 104 controls to decrease the quantization step of specific area 2. By this control, the block distortion for specific area 2 changes from 8 to 2. Hence, the evaluation value Ve(2) changes from 2.78 to 8.33. Since the quantization steps of specific area 1 and specific area 2 have changed, a code amount assigned to specific area 1 decreases and a code amount assigned to specific area 2 increases. In a subsequent period up to time T4, the evaluation value Ve(2) does not exceed the threshold, and the quantization step does not change.

At time T4, the object in specific area 1 faces sideways from the front, the value of the variable D changes from 10 to 5. The evaluation value Ve(1) therefore changes from 5.56 to 2.78. To the contrary, the evaluation value Ve(2) does not change from 8.33. In the subsequent period (period 45) between time T4 and time T5, the evaluation value Ve(2) does not exceed the threshold, and the quantization step does not change.

Second Embodiment

The functional arrangement of an image processing apparatus according to the second embodiment will be explained with reference to the block diagram of FIG. 4. Note that a detection unit 201, determination unit 203, control unit 204, and encoding unit 205 in FIG. 4 perform the same operations as those of the detection unit 101, determination unit 103, control unit 104, and encoding unit 105 shown in FIG. 1, and a description of these units will not be repeated. Building components different from FIG. 1 will be mainly explained.

An evaluation unit 202 calculates the evaluation value of a specific area detected from the image of a frame of interest using a predetermined evaluation formula and the importance of the specific area that is obtained by an importance determination unit 206. When a plurality of specific areas are detected from the image, the evaluation unit 202 calculates evaluation values for the respective specific areas.

The importance determination unit 206 determines the importance of a specific area detected from the image of a frame of interest by collating an object in the specific area and pieces of information about many objects that are held in a database 210. When a plurality of specific areas are detected from the image, the importance determination unit 206 calculates importance of each specific area.

Figure 5:
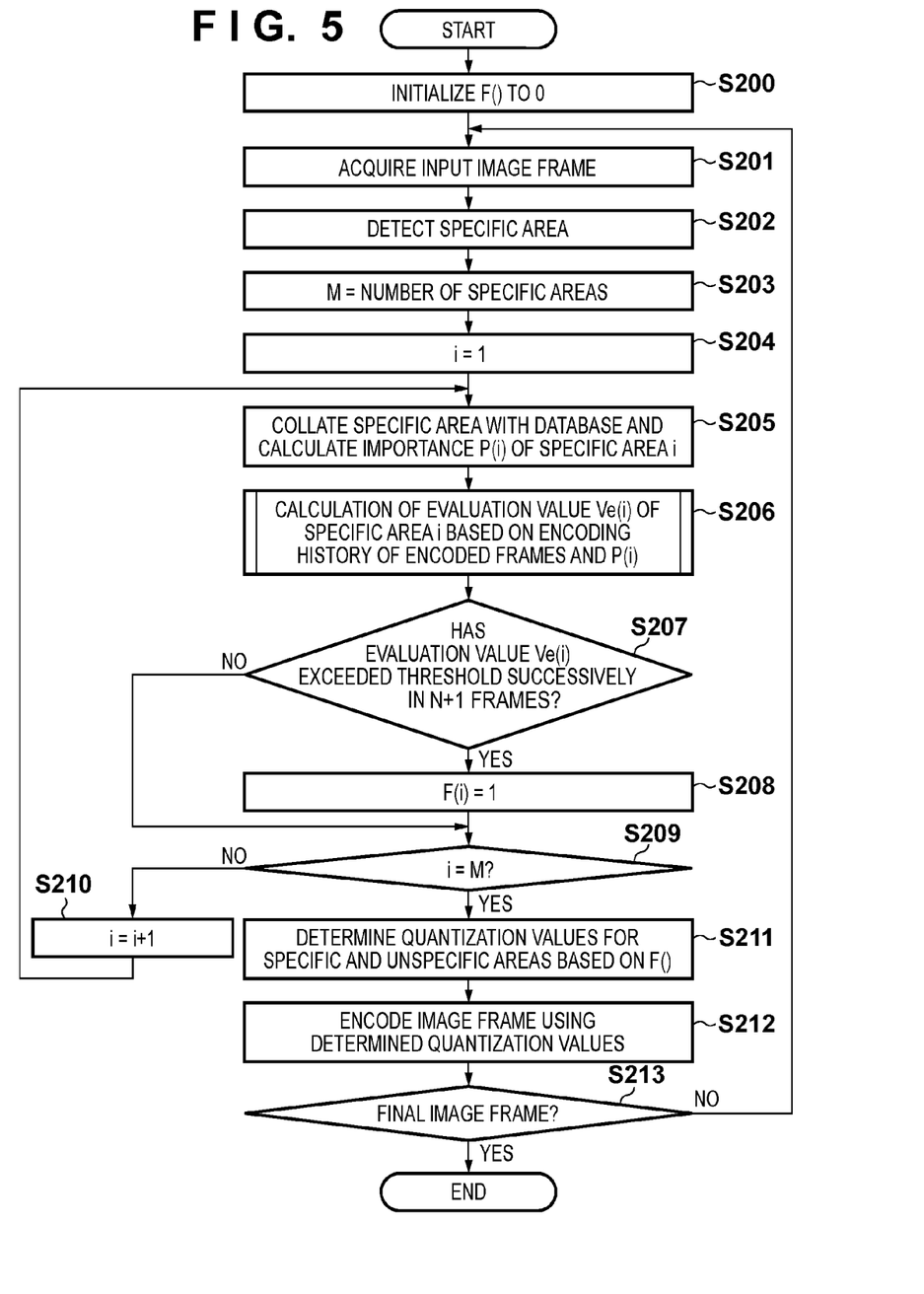
FIG. 5 is a flowchart showing processing to be performed by the image processing apparatus.
Figure 6:
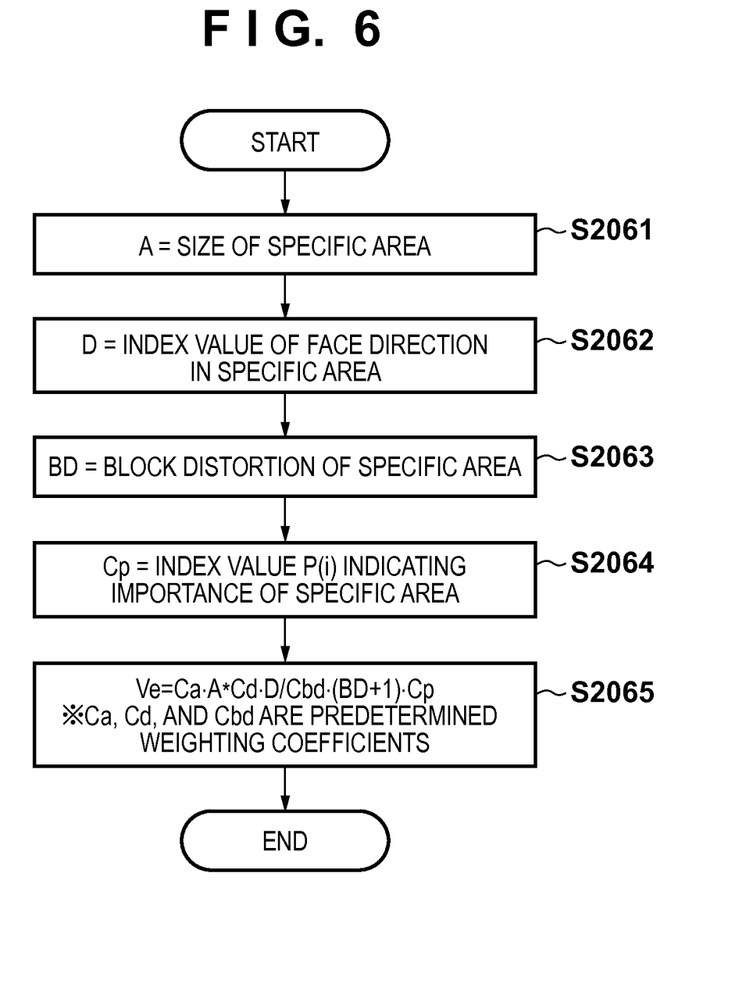
FIG. 6 is a flowchart showing processing to be performed by the image processing apparatus.

The operations of the respective units shown in FIG. 4 will be explained with reference to the flowcharts of FIGS. 5 and 6. Note that steps S200 to S204 and S207 to S213 shown in FIG. 5 are the same processing steps as steps S100 to S104 and S106 to S112 shown in FIG. 2, and a description of these steps will not be repeated.

In step S205, the importance determination unit 206 determines importance P(i) of an object within a specific area i by collating object information representing an object in the specific area i with pieces of object information about various objects that are registered in the database 210.

For example, importance information indicating the importance of an object is registered in advance in the database 210 for each object image in association with each other. The importance determination unit 206 specifies an image most similar to the object image in the specific area i out of various object images registered in the database 210, and reads out importance information which is registered in the database 210 in association with the specified image. The importance determination unit 206 sets, in P(i), importance indicated by the readout importance information. Needless to say, the method of determining the importance P(i) is not limited to this.

In step S206, the evaluation unit 202 calculates the evaluation value Ve(i) of the specific area i using a predetermined evaluation formula and the importance P(i) obtained in step S205. Details of the processing in step S206 will be explained with reference to the flowchart of FIG. 6. Note that steps S2061 to S2063 shown in FIG. 6 are the same processing steps as steps S1051 to S1053 in FIG. 3, and a description of these steps will not be repeated.

In step S2064, the evaluation unit 202 sets the importance P(i) obtained in step S205 in a variable Cp.

In step S2065, the evaluation unit 202 obtains the evaluation value Ve(i) for the specific area i by solving the following formula using the variables A, D, BD, and Cp whose values have been finalized in steps S2061 to S2064:

$$Ve = Ca \cdot A \times Cd \cdot D/Cbd \cdot (BD+1) \cdot Cp$$

where Ca, Cd, and Cbd are predetermined weighting coefficients. An arbitrary value of 0 or larger is set in advance for each weighting coefficient. Since the evaluation value Ve(i) is calculated to be smaller for higher importance P(i), a larger code amount tends to be assigned to a more important specific area. This calculation can provide the evaluation value Ve(i) for the specific area i. Note that the evaluation value calculation method and the parameters used to calculate an evaluation value are not limited to the above-described ones.

As described above, a larger quantization step is assigned to a specific area which has been encoded once to have a large evaluation value (for example, level high enough to specify a person), and a larger code amount is assigned to the remaining area. As a result, the remaining area can be encoded to have a large evaluation value.

In the first and second embodiments, when the variable F( ) is set to "1" in a given frame, it keeps holding "1" in subsequent frames. However, the variable F( ) may be initialized to "0" appropriately. For example, the variable F( ) may be periodically initialized for every L (L is a natural number) frames in accordance with the performance of the specific area tracking function of the detection unit 101 (201). When it is known that the performance of the tracking function is not so high, a risk arising from an erroneous specific area tracking result can be reduced by setting a small L value.

Even for a specific area for which the variable F( ) has become "1", the values of the size A and face direction D obtained when the variable F( ) became "1" may be held. In this case, when A and D become larger than these values, the variable F( ) is initialized to 0. This can leave a result having a larger evaluation value.

The first and second embodiments use the quantization step as an example of the encoding parameter. Alternatively, an arbitrary parameter may be applied as the encoding parameter as long as the parameter can control the code amount, such as the quantization scaling value or quantization table selection number.

The first and second embodiments have not especially mentioned an encoding technique to be employed. However, the present invention adopts an encoding method having an encoding parameter for controlling the code amount in accordance with a position within a frame, such as H.264 or MPEG-2.

The image processing apparatus described in each of the first and second embodiments is applicable not only as a real-time encoder, but also as a re-encoder used when decoding data which has temporarily been encoded with high image quality and then properly encoding it again.

Third Embodiment

Figure 4:
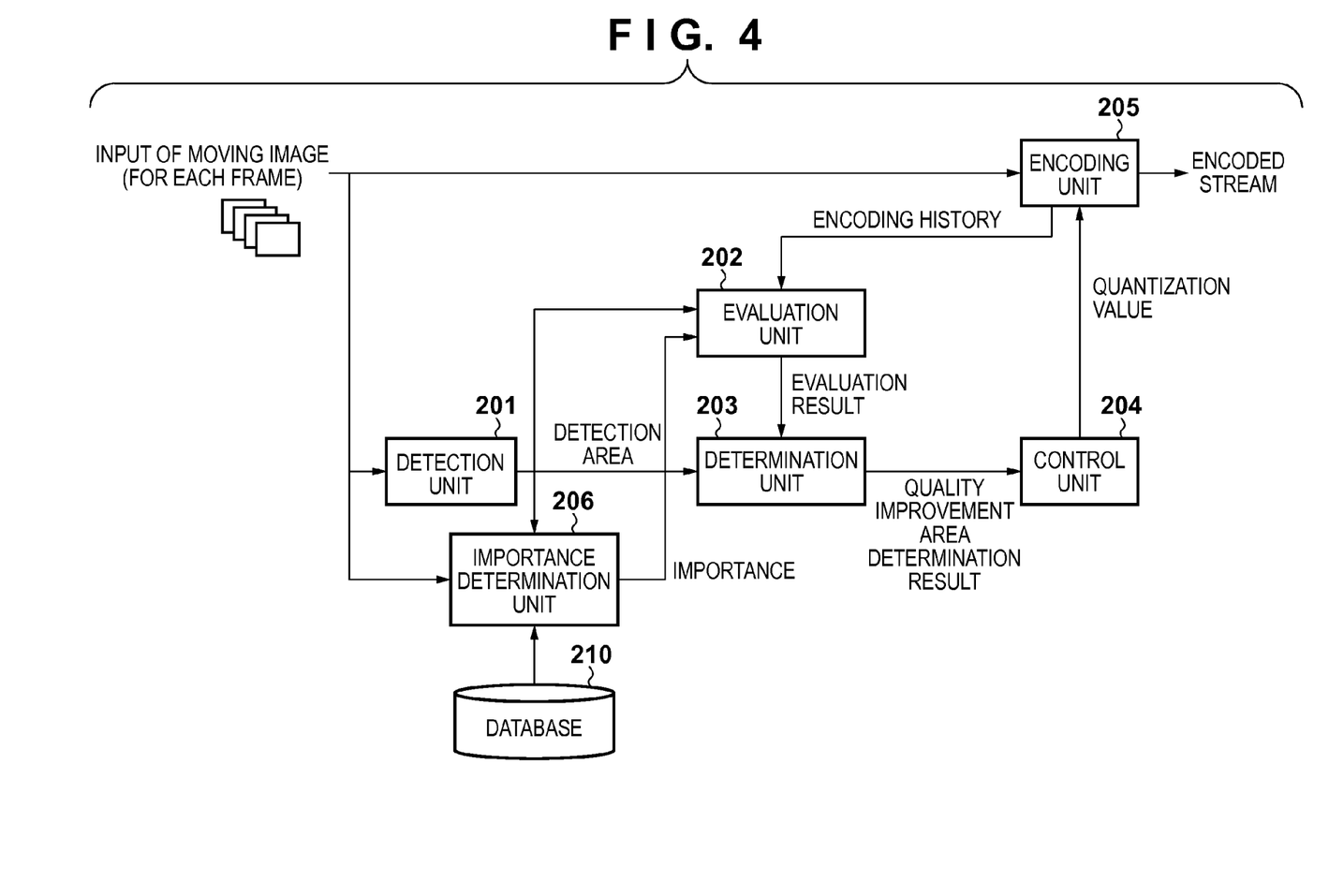
FIG. 4 is a block diagram exemplifying the functional arrangement of an image processing apparatus.

Although the respective units shown in FIG. 1 or 4 may be implemented by hardware components, a database 210 may be implemented by a data file and the respective units except for the database 210 may be implemented by software components (computer programs). In this case, a computer including the database 210 and a storage device (for example, hard disk) which holds these software components can function as the image processing apparatus according to each of the first and second embodiments. More specifically, the computer implements the functions of the respective units shown in FIG. 1 or 4 by reading out the software components by the CPU of the computer (if necessary, reading out data even from the database 210), and executing processing. The computer may be formed from one apparatus or two or more apparatuses.

INDUSTRIAL APPLICABILITY

According to the above-described embodiments, even when many important areas of a human face and the like exist in a frame, the code amount of the entire frame can be suppressed, and the frame can be encoded to easily identify an important object such as a human face in each area. The present invention is advantageously applicable to a video camera and the like for a monitoring purpose.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-107636 filed May 12, 2011 which is hereby incorporated by reference herein in its entirety.

What is claimed is:

1. An image processing apparatus which encodes respective frames that form a moving image, comprising:
    an extraction unit configured to extract a specific area from a frame based on an object appearing in the frame;
    an evaluation unit configured to obtain an evaluation value of the specific area;
    a determination unit configured to determine, on the basis of the evaluation value of the specific area in a preceding frame preceding the frame, an encoding parameter being used for encoding the specific area in the frame so that a code amount of the specific area in the frame is smaller than a code amount of the specific area in the preceding frame in a case where the evaluation values of the specific areas in the frame and preceding frame exceed a predetermined threshold, wherein an object which is detected from the frame for extracting the specific area from the frame corresponds to an object which is detected from the preceding frame for extracting the specific area from the preceding frame; and
    an encoding unit configured to encode the specific area in the frame on the basis of the encoding parameter which is determined by said determination unit for the frame.

2. The apparatus according to claim 1, wherein said evaluation unit obtains a higher evaluation value in a case where the specific area has a first size in comparison with a case where the specific area has a second size being smaller than the first size.

3. A non-transitory computer-readable storage medium storing a computer program for causing a computer to function as each unit of an image processing apparatus defined in claim 2.

4. The apparatus according to claim 1, wherein said evaluation unit obtains the evaluation value, the evaluation value being based on a direction of a face being detected as the object.

5. The apparatus according to claim 1, wherein said evaluation unit obtains a higher evaluation value in a case where a block distortion amount of the specific area is a first amount in comparison with a case where the block distortion amount of the specific area is a second amount being larger than the first amount.

6. The apparatus according to claim 1, wherein said evaluation unit acquires importance of the object in the specific area, and obtains a higher evaluation value in a case where the importance of the object is a first importance in comparison with a case where the importance of the object is a second importance being higher than the first importance.

7. A non-transitory computer-readable storage medium storing a computer program for causing a computer to function as each unit of an image processing apparatus defined in claim 1.

8. The apparatus according to claim 1, wherein said determination unit determines the encoding parameter for the frame on the basis of the evaluation value of the specific area in the frame and the evaluation values of the specific areas in a predetermined number of preceding frames, wherein an object which is detected from the frame for extracting the specific area from the frame corresponds to objects which are detected from the preceding frames for extracting the specific areas from the preceding frames.

9. An image processing method to be performed by an image processing apparatus which encodes respective frames that form a moving image, comprising:
    an extraction step configured to extract a specific area from a frame based on an object appearing in the frame;
    an evaluation step configured to obtain an evaluation value of the specific area;
    a determination step configured to determine, on the basis of the evaluation value of the specific area in a preceding frame preceding the frame, an encoding parameter being used for encoding the specific area in the frame so that a code amount of the specific area in the frame is smaller than a code amount of the specific area in the preceding frame in a case where the evaluation values of the specific areas in the frame and preceding frame exceed a predetermined threshold, wherein an object which is detected from the frame for extracting the specific area from the frame corresponds to an object which is detected from the preceding frame for extracting the specific area from the preceding frame; and an encoding step configured to encode the specific area in the frame on the basis of the encoding parameter which is determined by said determination unit for the frame.

10. The image processing method according to claim 9, wherein said evaluation step obtains a higher evaluation value in a case where the specific area has a first size in comparison with a case where the specific area has a second size being smaller than the first size.

\* \* \* \* \*